United States Patent [19]
Gabriele

[11] Patent Number: 5,568,976
[45] Date of Patent: Oct. 29, 1996

[54] IDLER BEARING MOUNT FOR MOUNTING OF INCLINED AGITATORS

[75] Inventor: Valentino Gabriele, Baltimore, Md.

[73] Assignee: J.C. Pardo & Sons, Baltimore, Md.

[21] Appl. No.: 566,943

[22] Filed: Dec. 4, 1995

[51] Int. Cl.[6] .................................. B01F 7/04; F16C 17/08
[52] U.S. Cl. ........................... 366/312; 366/331; 384/245
[58] Field of Search ........................... 366/64–67, 96–98, 366/279, 287, 309, 311, 312, 314, 331; 99/348; 384/243–246, 912, 913

[56] References Cited

U.S. PATENT DOCUMENTS

| | | | |
|---|---|---|---|
| 486,401 | 11/1892 | Grist | 384/243 |
| 1,557,600 | 10/1925 | Mademann | 384/243 |
| 1,668,839 | 5/1928 | Cureton | 384/243 |
| 2,027,756 | 1/1936 | Tay | 366/312 X |
| 2,723,110 | 11/1955 | Collins | 366/331 |
| 3,752,057 | 8/1973 | Groen, Jr. | 366/312 X |
| 4,199,266 | 4/1980 | Giusti | 99/348 X |
| 4,525,072 | 6/1985 | Giusti | 99/348 X |
| 4,571,091 | 2/1986 | Pardo et al. | 366/311 |
| 4,790,667 | 12/1988 | Pardo et al. | 366/311 |
| 4,818,116 | 4/1989 | Pardo et al. | 366/311 |
| 5,421,651 | 6/1995 | Pickering et al. | 366/311 |

*Primary Examiner*—Charles E. Cooley
*Attorney, Agent, or Firm*—Kenneth E. Darnell

[57] ABSTRACT

A bearing mount particularly useful for mounting a non-driven end of a rotary shaft of an inclined or vertical agitator used for the processing of materials such as pharmaceuticals, cosmetics, foodstuffs and the like in kettles wherein such materials are mixed or stirred either with or without scraping of inner wall surfaces of the kettles, the present bearing mount provides a bearing surface for the distal end of the rotary shaft of the agitator which extends into the interior of the kettle toward inner walls of the kettle and which said distal end requires a bearing mount to hold the end of the shaft in a desired spaced relation from the wall of the kettle. The bearing mount of the invention comprises an idler bushing mounted to the distal end of the shaft, the idler bushing having bearing surfaces which are complementary with bearing surfaces provided by an idler pin removably mounted to an idler base fixed to the inner wall of the kettle. In a particular embodiment of the invention, the idler pin is formed of a self-lubricating nickel alloy which meets USDA standards for metal to metal contact in food processing situations where the use of lubricant is regulated. The structure of the bearing mount of the invention can be rapidly disassembled for cleaning and can be readily repaired in the event of excessive wear or damage to the idler pin or idler bushing by replacement of same.

34 Claims, 3 Drawing Sheets

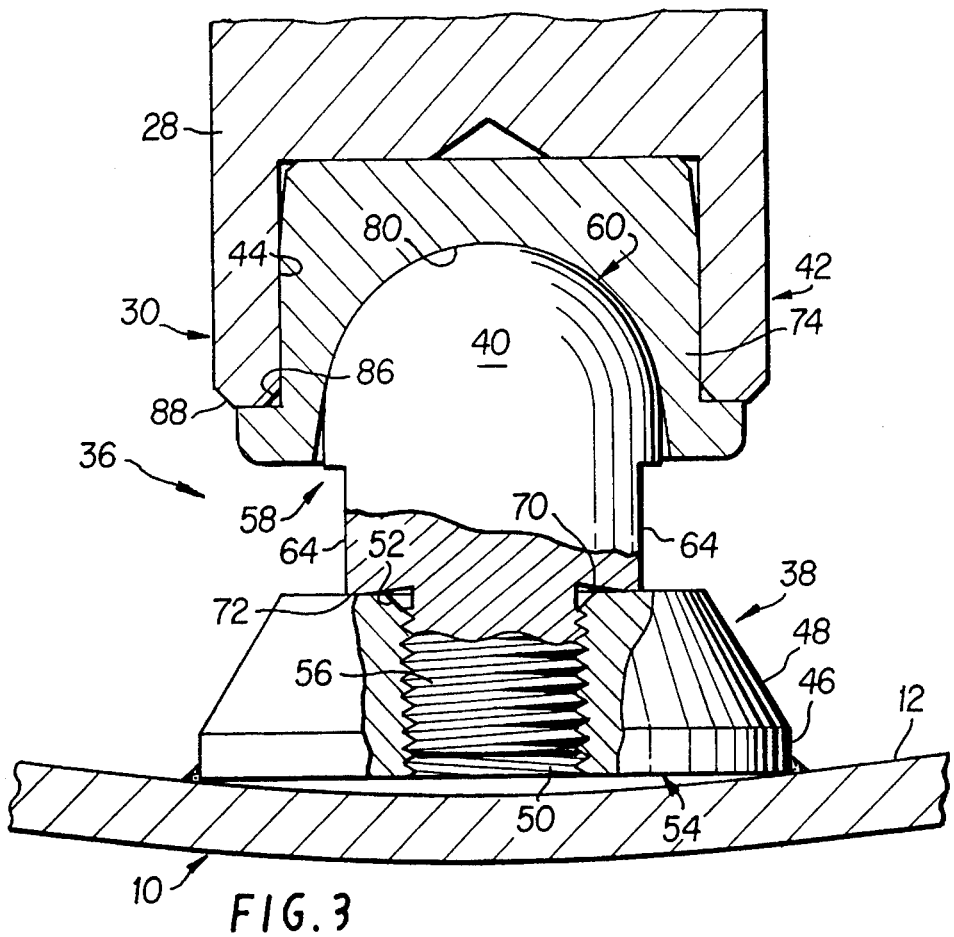
FIG. 3
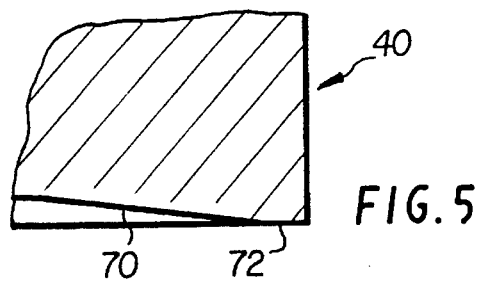
FIG. 4
FIG. 5

IDLER BEARING MOUNT FOR MOUNTING OF INCLINED AGITATORS

BACKGROUND OF THE INVENTION

1. Field of the Invention

The invention relates generally to structures for mounting an end of a rotary shaft of a mixing agitator or the like in relation to an inner wall of a kettle within which materials are to be mixed or stirred, the structure of the invention providing a bearing mountable within the confines of the kettle and to the inner wall thereof while allowing rapid disassembly for cleaning purposes and replacement of major parts when excessively worn or damaged.

2. Description of the Prior Art

The processing of many materials including pharmaceuticals, foodstuffs and the like on an industrial scale often requires mixing or stirring operations and, in some circumstances, the scraping of inner wall surfaces of a kettle within which the materials are being processed. Scraping of wall surfaces is particularly necessary in many situations involving the heating and/or cooking of food materials in large cooking kettles. Examples of mixing agitators which include a kettle wall scraping capability are disclosed in U.S. Pat. Nos. 3,752,057 to Groen, Jr.; 4,571,091 to Pardo et al and 4,790,667 to Pardo et al. The Pardo et al agitators include rotary shafts mounted within a kettle with the shaft disposed horizontally. Mounting of the Pardo et al horizontal agitators is readily accomplished through the use of bearing structures such as disclosed in the Pardo et al patents. Bearing structures typically used in association with the agitators of Pardo et al allow rapid disassembly of the agitator structure and bearing structure such that daily cleaning can be easily accomplished. Groen, Jr., in U.S. Pat. No. 3,752,057, describes a mixing agitator having a shaft which extends into a kettle at an angle of at least 20° with respect to the vertical axis of the kettle. The Groen, Jr. agitator is exemplary of an inclined agitator. However, many inclined agitators are configured with the non-driven end of the inclined rotary shafts thereof being mounted to a bearing located on an inner wall of a kettle such that the non-driven or distal end of the inclined shaft extending into the kettle has a bearing support. Inclined agitators so configured can provide stirring or mixing functions and can be fitted with scraping elements which allow scraping of wall surfaces of a kettle such as during a heating/cooking operation within the kettle. Certain other mixing agitators, some of which include scraping elements, are configured with the rotary shafts thereof disposed in a substantially vertical orientation with the non-driven or distal ends thereof extending into the interior of kettles or other containers within which processing operations occur. While vertically oriented agitators can be supported by structure mounting the end of the agitator shaft which is disposed outside of the kettle without contact with inner walls of the kettle, it is a common occurrence in the art to provide a bearing mounted to the inner wall of a kettle, such as at its lowermost location, so that the vertical shaft of the agitator can be mounted with at least the lower end of the agitator shaft within the kettle. Bearing structures of the prior art which are mounted to inner walls of a kettle for mounting inclined or vertical mixing agitators suffer from a number of disadvantages not the least of which is the necessity to conform to standards involving metal to metal contact occurring within the body of food materials being processed. Such bearings must operate within legal regulations relating to the use of lubricants within the body of food materials being processed within a kettle. Such bearing surfaces also must be formed of materials which comply with legal regulations involving metal to metal contact within the body of food materials being processed such as by the application of heat to the food materials during mixing, stirring and/or scraping of kettle wall surfaces. Prior art bearing structures also are generally not repairable due to the fact that the bearings are welded to inner walls of a kettle, excessive wear of the bearing or damage to the bearing thereby rendering the entire assembly useless.

The present invention provides a bearing mount useful with both inclined and vertical agitators in the processing of materials which can include the heating and/or cooking of food materials in a kettle either with or without scraping of inner walls of the kettle. The present bearing mount is configured to allow rapid removal from a kettle so that the bearing mount as well as the kettle and agitator can be readily cleaned on a daily basis according to accepted sanitary standards. The present bearing mount of the invention is formed of materials which meet USDA standards for metal to metal contact within a body of food materials being processed and in food processing situations wherein the use of lubricants is regulated. The present bearing mount of the invention can also be readily and rapidly repaired in the event of excessive wear or damage to major portions of the structure of the mount. Accordingly, the present invention provides substantial performance, operational and cost advantages over those bearing structures previously used in the art for the mounting of the non-driven end of a rotary shaft of a mixing agitator structure used in a kettle for processing of materials including food materials, pharmaceuticals and the like. The present invention also finds utility with rotary shaft structures wherein an end of the shaft structure, particularly a non-driven distal end, extends into a container and is mounted therewithin in spaced relation to an inner wall of the container, at least a portion of the shaft being disposed within the container and undergoing rotary motion therewithin.

SUMMARY OF THE INVENTION

The present invention provides a bearing mounting structure capable of being used to mount a rotary shaft, such as the shaft of an inclined or vertical agitator, within the interior of a processing kettle within which material such as foodstuffs, pharmaceuticals or the like are to be processed. The bearing mount of the invention provides a bearing surface for that end of a rotary shaft of an inclined or vertical agitator which extends into the interior of the kettle, said end of the rotary shaft being the non-driven end which can also be referred to as the distal end of the rotary shaft. The bearing mount of the invention is configured to allow rapid removal of the bearing mount as well as rapid removal of the agitator from the interior of the kettle so that the bearing mount, agitator and kettle can be readily cleaned on a daily basis according to sanitary standards common in the industry. The bearing mount of the invention is also formed of materials which do not require lubrication on bearing surfaces, the structure therefore meeting USDA standards for metal to metal contact for bearing surfaces and the like which function immersed in food materials being processed, such situations being commonplace in the food processing industry. The structure of the present invention is also repairable in the event of excessive wear or damage to the mount by replacement of major portions in the event that said major portions cannot be repaired by machining or the like.

The bearing mount of the invention includes a bearing element which is formed of a corrosion-resistant, anti-galling metal base alloy such as is manufactured by Waukesha Foundry, Inc. of Waukesha, Wis., the preferred nickel base alloy useful according to the invention being known as 88 Alloy. Other alloys produced by Waukesha Foundry, Inc., such as nickel base alloys known as 23 Alloy and 54C Alloy, can also be used especially in the event that operating temperatures higher than the nominal operating temperatures of 88 Alloy are necessary. In the case of 23 Alloy, operating temperatures of 600° F. can be accommodated while 54C Alloy allows use at temperatures up to 1600° F. In the food processing industry, the use of the 54C Alloy is not necessary. The 88 Alloy serves particularly well as one of the bearing elements of the present bearing mount since the bearing element so formed can be used in contact with stainless steel, chromium plate and a number of other metals without galling or seizing due to the chafing action of metal bearing surfaces which occurs on rotation of an agitator shaft mounted by the present bearing mount. Use of the 88 Alloy as preferred allows rotary operation of an agitator shaft without galling or seizing and within a metal to metal environment wherein the use of lubricants is generally prohibited. The 88 Alloy forming the bearing element of the present bearing mount is formed to present a bearing surface which mates with a stainless steel bearing surface such as is located on the distal end of the agitator shaft which extends into the interior of a processing kettle and into bearing contact with the bearing element of the bearing mount. It is to be understood that the bearing surface carried by the agitator shaft could be formed of 88 Alloy while the other bearing surface, previously described as being formed of the nickel base alloy, could be formed of stainless steel or the like.

The bearing mount of the invention is preferably mounted by an idler base formed of stainless steel and which is welded to the inner walls of a kettle at the lowermost portion thereof as in the case of the use of a vertical shaft agitator, or offset from the bottom of the kettle such as when an inclined agitator is used. An idler pin having a rounded end portion and a threaded shaft portion is mounted to the idler base through the expedient of a threaded bore formed in the idler base, the rounded portion of the idler pin thereby extending toward the distal end of a shaft to be mounted thereby. The rounded outer portion of the idler pin is thus formed of 88 Alloy and is received by mating bearing surfaces formed in the end of the rotary shaft, these bearing surfaces preferably being of complementary shape and being formed in an idler bushing removably mounted within a bore formed in the distal end of the shaft along the longitudinal axis of the shaft.

The bearing mount of the invention is thus rapidly and easily removed from the kettle along with the agitator itself for daily cleaning or for repair in the event of excessive wear of damage to the idler pin or idler bushing. The invention thus provides substantial advantages over the prior art especially in food processing situations wherein most bearing surfaces provided on inner walls of food processing kettles do not meet sanitary standards even though such structures have long been used in the art.

It is therefore an object of the invention to provide a bearing mount intended for mounting inclined or vertical agitator shafts such as are used for processing of materials including food materials in a kettle, the mount providing a bearing surface for that end of a rotary shaft of the agitator which extends into the interior of the kettle.

It is another object of the invention to provide a bearing mount capable of providing a bearing surface for the non-driven end of an inclined or vertical agitator mounted for operation within a processing kettle wherein lubrication is not required between the bearing surface and the end of the agitator.

It is a further object of the invention to provide a bearing mount intended to mount either inclined or vertical agitators within a processing kettle and wherein major portions of the bearing mount can be rapidly and easily removed from the kettle for cleaning according to accepted sanitary standards.

It is yet another object of the invention to provide a bearing mount having major portions which can be removed from a kettle for repair or replacement in the event of excessive wear or damage to said portions of the mount.

Other objects and advantages of the invention will become more readily apparent in light of the following detailed description of the preferred embodiments.

BRIEF DESCRIPTION OF THE DRAWINGS

FIG. 3 is a detailed elevational view in partial section of the bearing mount of the invention assembled within the kettle and functioning as a bearing mount relative to that end of the agitator which extends into the interior of the kettle;

FIG. 4 is a detail plan view taken along lines 4—4 of FIG. 2; and,

FIG. 5 is a detail sectional view taken along lines 5—5 of FIG. 4.

DESCRIPTION OF THE PREFERRED EMBODIMENTS

Figure 1:
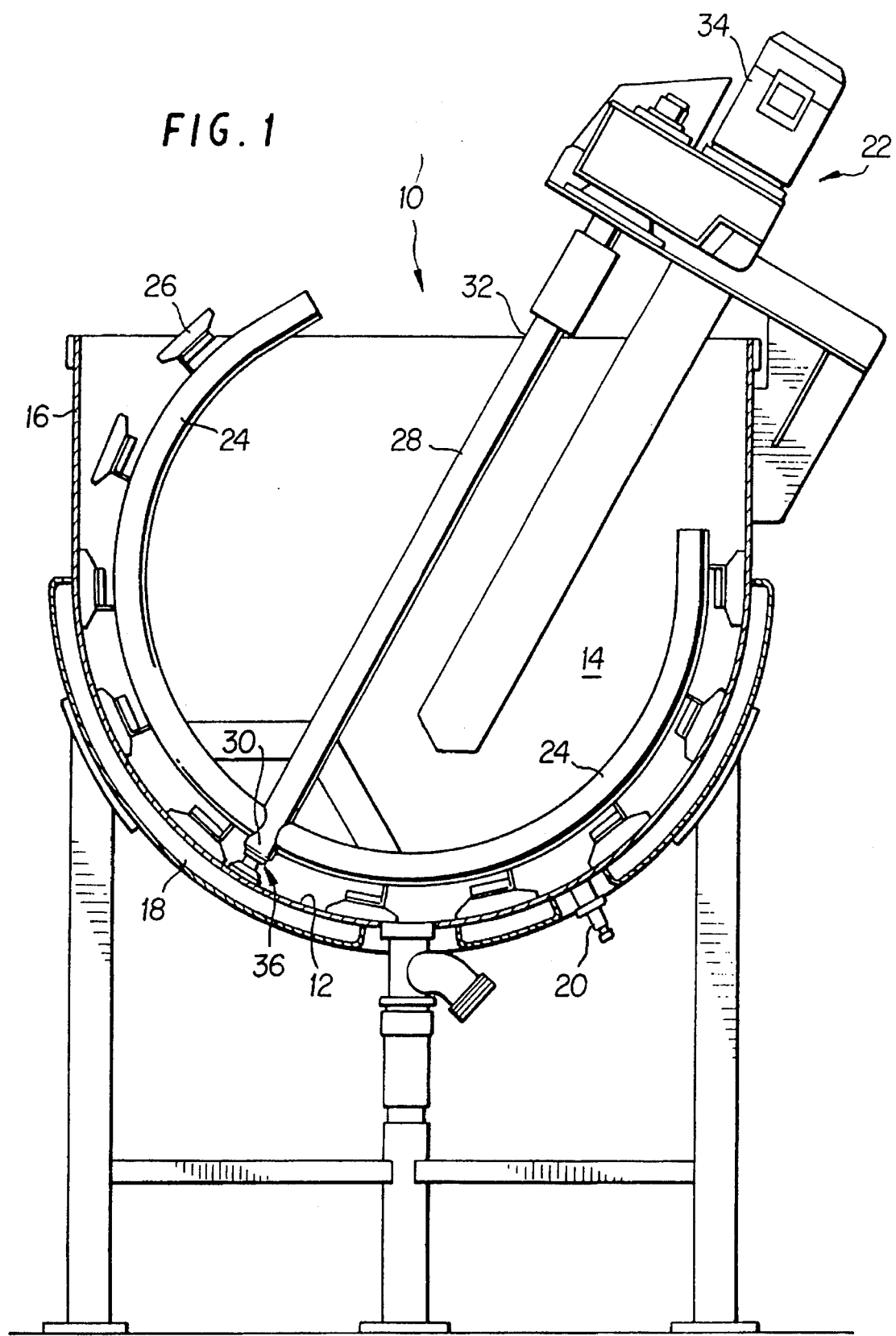
FIG. 1 is an elevational view in partial section of an inclined agitator and mixing kettle arrangement having a bearing mount of the invention mounted within the kettle and functioning to mount that end of the agitator disposed within the interior of the kettle.

Referring now to the drawings and particularly to FIG. 1, a kettle 10 having inner walls 12 which contact a material being processed within a kettle is seen to include a semi-spherical lower portion 14 and a cylindrical upper portion 16 as is conventional in the art. A steam jacket 18 can be formed over the exterior walls of the semi-spherical lower portion 14 of the kettle 10 in order to heat the kettle so that a heating and/or cooking function can occur within the interior of the kettle 10. It is to be understood that the kettle 10 can be utilized to heat and/or cook food materials or to heat or otherwise process other materials including pharmaceuticals, cosmetics and the like. It is also to be understood that materials held within the kettle 10 can merely be stirred or mixed either with or without heating according to the exigencies of a particular processing situation. The kettle 10 can be heated by means of steam or other heated fluid circulated within the steam jacket 18. Alternatively, the kettle 10 can be fired by a combustible material such as a gas as is conventional in the art. In order to determine temperatures within the kettle 10, a temperature probe 20 is seen to be mounted in an opening through the steam jacket 18 to facilitate control of a heating or cooking process within the kettle 10.

An inclined agitator 22 is seen to be mounted in operating relation to the kettle 10 as is conventional in the art, the agitator 22 having curvilinear supports 24 which mount scraping elements 26 in a conventional manner to scrape the walls 12 of the kettle 10. Scraping of the walls 12 of the kettle 10 is often necessary in food cooking operations to prevent adhesion or "burn-on" of food materials to the walls 12 during a cooking operation. The inclined agitator 22 further comprises a rotary shaft 28 which mounts the supports 24 near distal end 30 of the shaft 28. The distal end 30 of the shaft 28 is the non-driven end of the shaft, the distal end 30 extending into the interior of the kettle 10 while the free end 32 or driven end of the shaft 28 extends outwardly of the kettle 10 and mounts to a drive system 34 which is also conventional in the art. Further details of the agitator 22 and of the drive system 34 are not necessary to an understanding and appreciation of the present invention since the present invention relates to a bearing mount structure which mounts the distal end 30 of the rotary shaft 28 internally of the shaft 10 as will now be described.

Figure 2:
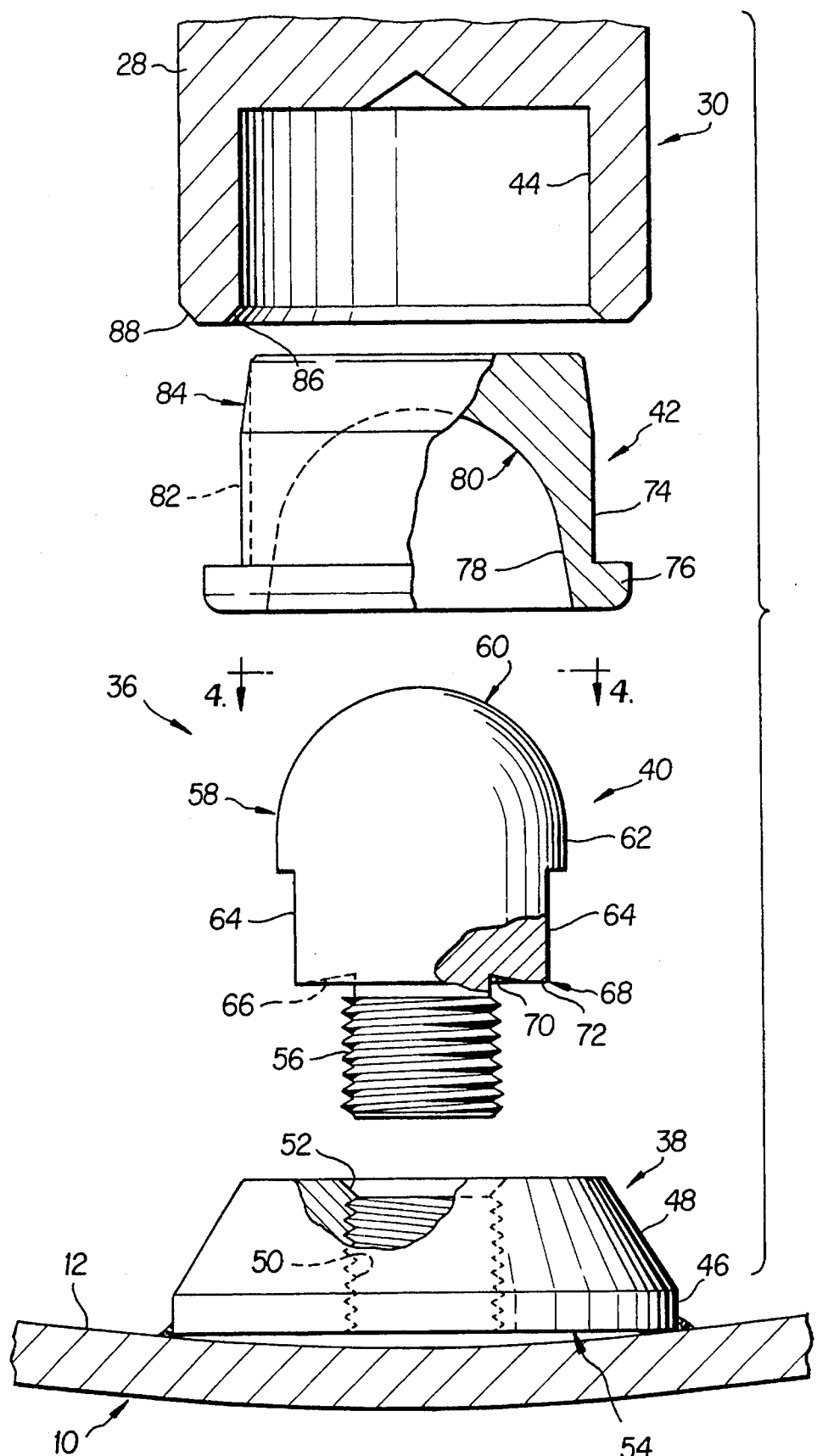
FIG. 2 is a detailed elevational view in partial section of a bearing mount of the invention in an assembly relationship with that portion of a kettle on which the bearing mount is disposed and extending toward an assembly relationship with the end of the rotary shaft of the agitator which is to be mounted within the kettle.

A bearing mount of the invention is shown generally in FIGS. 2 and 3 at 36 and is seen to include an idler base 38, an idler pin 40 and an idler bushing 42 which is received within a bore 44 formed in the distal end 30 of the rotary shaft 28 as will be described hereinafter. The idler base 38 can be formed of a unitary piece of stainless steel or suitable equivalent material, the base 38 comprising a base portion 46 and a beveled body portion 48. The base portion 46 is substantially cylindrical in conformation and reduces from its inner periphery to form the beveled body portion 48. A threaded bore 50 is formed centrally of the idler base 38 and extends through said base. A recessed annular beveled cutout 52 circumscribes the threaded bore 50 on the outer surface of the beveled body portion 48. The base portion 46 has a flattened conical section 54 formed over its outer surface, the height of the conical section 54 being greatest at the annular peripheral edge of the bore 50 at the location where the bore 50 extends through the outer surface of the base portion 46. The conical section 54, which has the effect of reducing the height of the base portion 46 in a gradual manner from the periphery of the bore 50 to the periphery of said base portion 46, facilitates welding of the idler base 38 to a portion of the inner walls 12 of the kettle 10. The shape of the conical section 54 provides for a better contact between the idler base 38 and the walls 12 of the kettle 10 since the walls 12 at the location of placement of the idler base 38 constitutes a spherical surface section.

After attachment of the idler base 38 to the walls 12 of the kettle 10, the idler pin 40 is mounted to the idler base 38 by coupling of a threaded shaft 56 of the idler pin 40 to the threaded bore 50 of the idler base 38. The threads of the bore 50 and of the shaft 56 will be either right-handed or left-handed depending upon the rotation of the shaft 28 in operation. The idler pin 40 further comprises a bulbous body portion 58 which is formed essentially of a cylindrical piece of a nickel base alloy which is corrosion-resistant and anti-galling and which particularly allows metal to metal contact without the need for lubrication other than that provided by the idler pin 40 itself. The idler pin 40 is particularly formed of a material known as 88 Alloy which is a product of the Waukesha Foundry, Inc. of Waukesha, Wis., further description of the 88 Alloy being provided hereinafter. It is preferred that the entire idler pin 40 be formed of the 88 Alloy although the threaded shaft 56 could be formed of another material such as stainless steel and then attached to the body portion 58. The cylindrical piece of the 88 Alloy from which the body portion 58 is formed is rounded at the end thereof opposite attachment of the threaded shaft 56 to a spherical bearing surface 60 which defines the spherical outer end of the body portion 58. The spherical bearing surface 60 tapers at its periphery to a cylindrical body potion 62, the body portion 62 becoming cylindrical immediately before the body portion 58 becomes completely semi-spherical. The cylindrical body portion 62 is cut-away on opposite sides thereof to form shoulder sections 64 which function as "flats" for use of a wrench or similar tool to attach the idler pin 40 to the idler base 38 and to remove same. That surface of the cylindrical body portion 62 to which the threaded shaft 56 is attached is relieved thereacross with a flattened depression 66 which allows peripheral edge 68 to bear against outer surfaces of the idler base 38 when the idler pin 40 is assembled to the base 38, thereby producing a degree of tension between the idler base 38 and the idler pin 40. As best seen in reference to FIGS. 4 and 5, arcuate relieved cutouts 70 are disposed on opposite sides of the body portion 58 and extended into communication with the space from which material was removed to form the shoulder sections 64, the cutout 70 being defined at the outer periphery thereof by arcuate flats 72, the cutout 70 having an increasing height toward the center of the body portion 58. The cutout 70 also acts to provide tension between the idler base 38 and the idler pin 40 on assembly.

The idler bushing 42 is conveniently formed of stainless steel or similar material approved for a processing situation such as the processing of food, the bushing 42 having a cylindrical body portion 74 which terminates at one end with an annular flange 76. The flange 76 is seen to be rounded about outer peripheral edges thereof. A semi-spherical bearing cavity 78 is formed in the body portion 74 through the end thereof which bears the flange 76, surfaces of the bearing cavity 78 comprising bearing surfaces 80 which are complementary to the spherical bearing surfaces 60 of the idler pin 40, as will be described in more detail hereinafter. The body portion 74 is essentially solid throughout with the exception of the bearing cavity 78 and a groove 82 extending from the flange 76 and terminating just prior to reaching the opposite end of the body portion 74. At this opposite end of the body portion 74, the diameter of the body portion 74 is reduced to form a tapered end portion 84 which facilitates insertion of the idler bushing 42 into the bore 44 formed in the distal end 30 of the shaft 28. The bore 44 is substantially cylindrical in shape and is surmounted by a recessed bevel 86. The outer peripheral edge of the distal end 30 is also beveled to form an annular bevel 88. The inner diameter of the bevel 88 is preferably identical to the diameter of the annular flange 76.

The idler bushing 42 is inserted into the bore 44, the outer diameter of the cylindrical body portion 74 of the bushing 42 being slightly less than the diameter of the bore 44 so that the idler bushing 42 is flushly received thereinto. It should be understood that the idler bushing 42 can be readily removed from the bore 44 for cleaning, repair or the like. The agitator 22 is then placed in the interior of the kettle 10 such that the spherical bearing surfaces 60 of the idler pin 40 come into contact with the bearing surfaces 80 of the idler bushing 42, that is, the distal end 30 of the shaft 28 is mounted directly to the idler pin 40 which has previously been attached to the idler base 38. The agitator 22 is then mounted at the non-driven end thereof, that is, the distal end 30, for rotation within the kettle 10. The assembly of the agitator 22 to the bearing mount 36 is seen best in FIG. 3.

After a period of use of the kettle 10 and the agitator 22, it becomes necessary in view of sanitary standards to remove the agitator 22 from the kettle 10 for cleaning of the agitator and kettle as well as all structure associated therewith. The agitator 22 is then lifted from the kettle 10 for cleaning and the idler bushing 42 is removed from the bore 44 for cleaning of the bushing 42 and of the bore 44. The idler pin 40 is then removed through the use of a wrench or the like for cleaning, the idler base 38 then being exposed fully for cleaning. In the event of excessive wear of or damage to the idler pin 40 or the idler bushing 42, these structural elements can be easily removed for repair or replacement.

The shape of the body portion 58 defining the spherical bearing surface 60 as well as the complementary shape of the bearing surfaces 80 can be chosen to be other than as explicitly described herein, the intent of the invention being to provide desired bearing surfaces. To this end, the bearing surfaces 60 and 80 could be otherwise defined while remaining complementary, the number of differing shapes being substantial and including bullet shapes, distally flattened ogive shapes, etc.

It is also to be understood that the idler bushing 42 could be formed of the nickel alloy previously referred to while the body portion 58 of the idler pin 40 could be formed of stainless steel. However, it is preferred to form the idler pin 40 and particularly the body portion 58 thereof of a nickel base alloy produced by Waukesha Foundry, Inc. as alluded to hereinabove. The alloy particularly intended for use is known as 88 Alloy and is nominally formed of nickel with the following alloy constituents:

| | |
|---|---|
| Carbon | .03% |
| Tin | 4.0% |
| Manganese | 1.0% |
| Molybdenum | 3.0% |
| Iron | 1.5% |
| Bismuth | 4.0% |
| Silicon | .30% |
| Chromium | 12.5% |

While the 88 Alloy produced by Waukesha Foundry, Inc. is preferred, it is to be understood that other materials can be employed including other alloys produced by Waukesha Foundry, Inc. In particular, for those processing situations wherein added lubrication can be employed without violation of governmental standards, materials other than the Waukesha alloys can be employed.

While the invention has been described in relation to the particular structure shown in the drawings, it is to be understood that the invention can be otherwise configured while retaining the intended scope of the invention. As an example, it is to be understood that the bearing mount 36 of the invention can function within the kettle 10 at any desired location whereby the distal end of an inclined agitator or vertical agitator is to be disposed within the confines of the kettle 10. Particularly, the bearing mount 32 can be disposed at the lowermost portion of the kettle in order to accommodate the rotary shaft of a vertical agitator. In such a situation, the bearing mount 36 of the invention can take the same form as that used for the inclined agitator 22 as is shown and described herein.

What is claimed is:

1. In combination, a kettle having inner walls and an agitator having a rotary shaft, the rotary shaft having a distal end extending into the interior of the kettle and having a free end extending from the interior of the kettle and mounted to a drive system for rotation of the shaft to mix materials being processed within the kettle, the combination further comprising:

a base fixed to a portion of the inner walls of the kettle, the base comprising a cylindrical base portion having a conical section formed on an inner planar end thereof and a beveled body portion formed outwardly of the base portion, a threaded bore formed centrally of the base portion and body portion and extending therethrough in alignment with the longitudinal axis of the combined base portion and body portion, the conical section of the base portion having the greatest height thereof about the periphery of the bore with said section tapering toward annular perimetric portions of the inner planar end of the base portion, the conical section facilitating attachment of the base to the walls of the kettle;

pin means removably mountable to the base and having a body portion defining first bearing surfaces; and, bushing means removably mountable to the distal end of the rotary shaft and having a body portion defining second bearing surfaces complementary to said first bearing surfaces, at least a portion of the pin means defining said first bearing surfaces being received into contact with the second bearing surfaces to mount the distal end of the rotary shaft relative to inner walls of the kettle.

2. The combination of claim 1 wherein either the first or second bearing surfaces are formed of a self-lubricating nickel alloy.

3. The combination of claim 2 wherein the other of the bearing surfaces is formed of stainless steel.

4. The combination of claim 1 wherein the pin means is formed of a self-lubricating nickel alloy.

5. The combination of claim 1 wherein the base is fixed to the walls of the kettle at the lowermost location thereof to mount a vertical agitator.

6. The combination of claim 1 wherein the base is fixed to the walls of the kettle at a location spaced from the lowermost location thereof to mount an inclined agitator.

7. The combination of claim 1 wherein the body portion of the pin means comprises:

an idler pin body portion having a substantially spherical bearing surface formed on an outer end thereof, the spherical bearing surface defining the first bearing surfaces; and, a threaded shaft formed on the other end of the idler pin body portion, the threaded shaft mating with the threaded bore of the base to removably attach the pin means to the base.

8. The combination of claim 7 wherein opposite portions of the idler pin body portion are cut-away at the end thereof near the threaded shaft to form flats engageable with a wrench or similar tool to attach the pin means to the base or to remove the pin means from the base.

9. The combination of claim 7 wherein the surface of the end of the idler pin body portion to which the threaded shaft is attached is concavely formed from the annular perimetric edge of said end to central portions of said surface.

10. The combination of claim 9 wherein portions of the surface of the idler pin body portion to which the threaded shaft is attached and near at least portions of the perimetric edges thereof are cut-away at locations spaced from the perimetric edges to form arcuate relieved cutouts tapering to the greatest heights thereof toward the center of said surface.

11. The combination of claim 7 wherein the body portion of the bushing means comprise:

a cylindrical bushing body portion having an annular flange formed at one end thereof, a substantially spherical bearing cavity being formed in said one end of the bushing body portion, walls of the cavity defining the second bearing surfaces, the bushing body portion having a tapered portion formed on the opposite end thereof to facilitate removable mounting of the bushing means in a cylindrical bore formed in the distal end of the shaft, the spherical bearing cavity receiving the spherical bearing surface of the idler pin body portion therein to engage said bearing surfaces and mount the shaft for rotation relative to the pin means.

12. The combination of claim 7 wherein the pin means is formed of a self-lubricating nickel alloy.

13. In combination, a kettle having inner walls and an agitator having a rotary shaft, the rotary shaft having a distal end extending into the interior of the kettle and having a free end extending from the interior of the kettle and mounted to a drive system for rotation of the shaft to mix materials being processed within the kettle, the combination further comprising:

a base fixed to a portion of the inner walls of the kettle and having a threaded bore formed therein;

pin means removably mountable to the base and having a body portion defining first bearing surfaces, the body portion of the pin means comprising an idler pin body portion having a substantially spherical bearing surface formed on an outer end thereof, the spherical bearing surface defining the first bearing surfaces, and a threaded shaft formed on the other end of the idler pin body portion, the threaded shaft mating with the threaded bore of the base to removably attach the pin means to the base; and, bushing means removably mountable to the distal end of the rotary shaft and having a body portion defining second bearing surfaces complementary to said first bearing surfaces, at least a portion of the pin means defining said first bearing surfaces being received into contact with the second bearing surfaces to mount the distal end of the rotary shaft relative to inner walls of the kettle.

14. The combination of claim 13 wherein the pin means is formed of a self-lubricating nickel alloy.

15. The combination of claim 13 wherein opposite portions of the idler pin body portion are cut-away at the end thereof near the threaded shaft to form flats engageable with a wrench or similar tool to attach the pin means to the base or to remove the pin means from the base.

16. The combination of claim 15 wherein the surface of the end of the idler pin body portion to which the threaded shaft is attached is concavely formed from the annular perimetric edge of said end to central portions of said surface.

17. The combination of claim 16 wherein portions of the surface of the idler pin body portion to which the threaded shaft is attached and near at least portions of the perimetric edges thereof are cut-away at locations spaced from the perimetric edges to form arcuate relieved cutouts tapering to the greatest heights thereof toward the center of said surface.

18. The combination of claim 17 wherein the pin means is formed of a self-lubricating nickel alloy.

19. The combination of claim 13 wherein the body portion of the bushing means comprise:

a cylindrical bushing body portion having an annular flange formed at one end thereof, a substantially spherical bearing cavity being formed in said one end of the bushing body portion, walls of the cavity defining the second bearing surfaces, the bushing body portion having a tapered portion formed on the opposite end thereof to facilitate removable mounting of the bushing means in a cylindrical bore formed in the distal end of the shaft, the spherical bearing cavity receiving the spherical bearing surface of the idler pin body portion therein to engage said bearing surfaces and to mount the shaft for rotation relative to the pin means.

20. The combination of claim 13 wherein either the first or second bearing surfaces are formed of a self-lubricating nickel alloy.

21. The combination of claim 20 wherein the other of the bearing surfaces is formed of stainless steel.

22. The combination of claim 13 wherein the base is fixed to the walls of the kettle at the lowermost location thereof to mount a vertical agitator.

23. The combination of claim 13 wherein the base is fixed to the walls of the kettle at a location spaced from the lowermost location thereof to mount an inclined agitator.

24. Apparatus for mounting a rotary shaft relative to a wall-like surface for relative rotation between the shaft and the surface, comprising:

a base fixed to a portion of the surface, the base comprising a cylindrical base portion having a conical section formed on an inner planar end thereof and a beveled body portion formed outwardly of the base portion, a threaded bore formed centrally of the base portion and body portion and extending therethrough in alignment with the longitudinal axis of the combined base portion and body portion, the conical section of the base portion having the greatest height thereof about the periphery of the bore with said section tapering toward annular perimetric portions of the inner planar end of the base portion, the conical section facilitating attachment of the base to the surface;

pin means removably mountable to the base and having a body portion defining first bearing surfaces; and, bushing means removably mountable to the distal end of the rotary shaft and having a body portion defining second bearing surfaces complementary to said first bearing surfaces, at least a portion of the pin means defining said first bearing surfaces being received into contact with the second bearing surfaces to mount the distal end of the rotary shaft relative to the wall-like surface.

25. The apparatus of claim 24 wherein either the first or second bearing surfaces are formed of a self-lubricating nickel alloy.

26. The apparatus of claim 24 wherein the body portion of the pin means comprises:

an idler pin body portion having a substantially spherical bearing surface formed on an outer end thereof, the spherical bearing surface defining the first bearing surfaces; and, a threaded shaft formed on the other end of the idler pin body portion, the threaded shaft mating with the threaded bore of the base to removably attach the pin means to the base.

27. The apparatus of claim 26 wherein the surface of the end of the idler pin body portion to which the threaded shaft is attached is concavely formed from the annular perimetric edge of said end to central portions of said spherical bearing surface.

28. The apparatus of claim 27 wherein portions of the surface of the idler pin body portion to which the threaded shaft is attached and near at least portions of the perimetric edges thereof are cut-away at locations spaced from the perimetric edges to form arcuate relieved cutouts tapering to the greatest heights thereof toward the center of said surface of the idler pin body portion.

29. The apparatus of claim 26 wherein the body portion of the bushing means comprise:

a cylindrical bushing body portion having an annular flange formed at one end thereof, a substantially spherical bearing cavity being formed in said one end of the bushing body portion, walls of the cavity defining the second bearing surfaces, the bushing body portion having a tapered portion formed on the opposite end thereof to facilitate removable mounting of the bushing means in a cylindrical bore formed in the distal end of the shaft, the spherical bearing cavity receiving the spherical bearing surface of the idler pin body portion therein to engage said bearing surfaces and to mount the shaft for rotation relative to the pin means.

30. Apparatus for mounting a rotary shaft relative to a wall-like surface for relative rotation between the shaft and the surface, comprising:

a base fixed to a portion of the wall-like surface and having a threaded bore formed therein;

pin means removably mounted to the base and having a body portion defining first bearing surfaces, the body portion of the pin means comprising an idler pin body portion having a substantially spherical bearing surface formed on an outer end thereof, the spherical bearing surface defining the first bearing surfaces, and a threaded shaft formed on the other end of the idler pin body portion, the threaded shaft mating with the threaded bore of the base to removably attach the pin means to the base; and, bushing means removably mountable to the distal end of the rotary shaft and having a body portion defining second bearing surfaces complementary to said first bearing surfaces, at least a portion of the pin means defining said first bearing surfaces being received into contact with the second bearing surfaces to mount the distal end of the rotary shaft relative to said wall-like surface.

31. The apparatus of claim 30 wherein the body portion of the bushing means comprise:

a cylindrical bushing body portion having an annular flange formed at one end thereof, a substantially spherical bearing cavity being formed in said one end of the bushing body portion, walls of the cavity defining the second bearing surfaces, the bushing body portion having a tapered portion formed on the opposite end thereof to facilitate removable mounting of the bushing means in a cylindrical bore formed in the distal end of the shaft, the spherical bearing cavity receiving the spherical bearing surface of the idler pin body portion therein to engage said bearing surfaces and to mount the shaft for rotation relative to the pin means.

32. The apparatus of claim 30 wherein either the first or second bearing surfaces are formed of a self-lubricating nickel alloy.

33. The apparatus of claim 30 wherein the pin means is formed of a self-lubricating nickel alloy.

34. The apparatus of claim 33 wherein the other of the bearing surfaces is formed of stainless steel.

* * * * *